United States Patent
Takagi et al.

(10) Patent No.: US 8,662,871 B2
(45) Date of Patent: Mar. 4, 2014

(54) TIRE VULCANIZING DEVICE

(75) Inventors: Chikara Takagi, Hashima (JP); Shigeaki Nomura, Hashima (JP); Yuichi Higuchi, Hashima (JP)

(73) Assignees: Fuji Shoji Co., Ltd., Hashima-shi (JP); Fuji Seiko Co., Ltd., Hashima-shi (JP)

( * ) Notice: Subject to any disclaimer, the term of this patent is extended or adjusted under 35 U.S.C. 154(b) by 0 days.

(21) Appl. No.: 13/511,079

(22) PCT Filed: Nov. 9, 2010

(86) PCT No.: PCT/JP2010/069963
§ 371 (c)(1),
(2), (4) Date: May 21, 2012

(87) PCT Pub. No.: WO2011/077844
PCT Pub. Date: Jun. 30, 2011

(65) Prior Publication Data
US 2012/0263813 A1    Oct. 18, 2012

(30) Foreign Application Priority Data
Dec. 24, 2009    (JP) .................................. 2009-292119

(51) Int. Cl.
*B29C 33/04*    (2006.01)
(52) U.S. Cl.
USPC .................................. 425/36; 425/40; 425/46
(58) Field of Classification Search
USPC .................................... 425/36, 40, 41, 42, 46
See application file for complete search history.

(56) References Cited

U.S. PATENT DOCUMENTS

| 4,207,052 A * | 6/1980 | Satzler .......................... 425/394 |
| 7,001,163 B2 * | 2/2006 | McBride et al. ................ 425/46 |
| 7,901,608 B2 | 3/2011 | Takagi et al. |
| 2011/0183022 A1 | 7/2011 | Takagi et al. |

FOREIGN PATENT DOCUMENTS

| GB | 1050992 | * 12/1966 |
| JP | 1-184106 | * 7/1989 |
| JP | 2002 172624 | 6/2002 |
| JP | 2005-319599 | * 11/2005 |
| JP | 2006 224417 | 8/2006 |
| JP | 2007 223290 | 9/2007 |

OTHER PUBLICATIONS

International Search Report Issued Dec. 7, 2010 in PCT/JP10/69963 Filed Nov. 9, 2010.

* cited by examiner

*Primary Examiner* — James Mackey
(74) *Attorney, Agent, or Firm* — Oblon, Spivak, McClelland, Maier & Neustadt, L.L.P.

(57) ABSTRACT

A tire vulcanizing device including: an upper annular mold attaching member and a lower annular mold attaching member that respectively attach side portion forming molds for forming side portions of a tire; a plurality of segments that respectively attach a plurality of segmented tread molds for forming a tread portion of the tire; and a mold closing mechanism for radially moving the segments to close the tread molds at an advanced end. The respective segments are respectively independently provided with heat medium passages for applying heat for vulcanization to the tread molds when supplied with a heat medium.

3 Claims, 5 Drawing Sheets

TIRE VULCANIZING DEVICE

TECHNICAL FIELD

The present invention relates to a tire vulcanizing device for heating segmented molds uniformly.

BACKGROUND ART

Heretofore, in tire vulcanizing devices, it is conventional to insert an unvulcanized tire into molds, to heat the molds by an outside heat supply arranged outside the molds, and to introduce high temperature steam into the interior of a bladder having been inserted into the tire so that vulcanization is carried out by using the steam as an inside heat supply. In Patent document 1 on a vulcanizing device provided with such an outside heat supply, it is described that passages for flowing a heat medium as an outside heat supply are provided in a mold closing ring member which is arranged around segmented tread molds and segments with the segmented tread molds assembled thereto, to heat the segmented tread molds.

PRIOR ART DOCUMENT

Patent Document

Patent Document 1: JP 2007-223290 A

SUMMARY OF THE INVENTION

Problem to be Solved by the Invention

However, in one described in Patent Document 1, the heat medium is made to pass through the passages provided in the mold closing ring member, to heat the segments adjoining the mold closing ring member. Thus, the segmented tread molds are heated indirectly through the segments, whereby a long period of time is spent to reach a predetermined vulcanization temperature. In particular, when a plurality of tires are vulcanized in succession, the molds are opened to replace tires after each vulcanization, whereby the temperature of the molds is lowered once. This gives rise to a problem that the efficiency in manufacturing is lowered because a long period of time is taken to return the molds to the predetermined temperature required for vulcanization. Further, the passages for the heat medium are turned annularly around the segments with the segmented tread molds assembled thereto. Thus, the heat medium is decreased in temperature while the heat medium is introduced from an inlet for the passages, is flown around the outer circumference of the segmented tread molds, and is discharged from an outlet for the passages, so that a temperature difference takes place between the molds heated around the inlet for the heat medium passages and those heated around the outlet for the heat medium passages. In this case, because the vulcanizing time is set taking the outlet side low in temperature into consideration, the vulcanizing time has to be set longer. Furthermore, there arises a risk that a tire being uniform in physical property cannot be obtained because of being unable to be heated uniformly.

The present invention has been made taking the foregoing problems in the prior art into consideration and provides a vulcanizing device which is capable of shortening the time period for vulcanization and obtaining a tire being uniform in physical property.

Solution to the Problem

In order to solve the foregoing problems, the feature in construction of the invention in a first aspect resides in that in a tire vulcanizing device provided with an upper annular mold attaching member and a lower annular mold attaching member which respectively attach side portion forming molds for forming side portions of a tire, a plurality of segments attaching a plurality of segmented tread molds for forming a tread portion of the tire, and a mold closing mechanism for radially moving the respective segments to close the respective tread molds at an advanced end, the respective segments are respectively independently provided with heat medium passages for applying heat for vulcanization to the tread molds when supplied with a heat medium.

The feature in construction of the invention in a second aspect resides in that in the first aspect, the heat medium passages are controllable in temperature on a segment-by-segment basis.

The feature in construction of the invention in a third aspect resides in that in the first or second aspect, there are further provided an upper heat medium passage provided in the upper annular mold attaching member for applying heat for vulcanization to one of the side portion forming molds when supplied with a heat medium, and a lower heat medium passage provided in the lower annular mold attaching member for applying heat for vulcanization to the other of the side portion forming molds when supplied with the heat medium, and that the upper heat medium passage and the lower heat medium passage are respectively supplied with the heat mediums being different in temperature.

Effects of the Invention

According to the invention in the first aspect, the heat medium passages are respectively provided for the segments which respectively attach the segmented tread molds thereto. Thus, the tread molds can be efficiently heated from positions adjacent thereto. In particular, where a plurality of tires are vulcanized in succession, the tread molds decrease in temperature once as a result that the molds are opened for replacement of tires after each vulcanization. However, the vulcanizing time is shortened by shorting the time taken to increase the temperature of the tread molds, whereby the efficiency in manufacturing tires can be enhanced. Furthermore, since the heat medium passages are independent of one another on the segment-by-segment basis, it does not take place that as is the case of the prior art, a temperature drop of the heat medium making a round of the tread molds causes a difference in temperature between the molds that are heated respectively around the inlet and the outlet for the heat medium passages. Thus, it becomes possible to heat the molds uniformly in vulcanization and hence, to obtain a tire being uniform in physical property. Since it is not required to set the vulcanizing time for those being low in temperature, the vulcanizing time can be shortened.

According to the invention in the second aspect, the tread molds can be heated through the temperature adjustments on the segment-by-segment basis. Thus, the molds can as a whole be held at a uniform temperature by adjusting the heated molds to the uniform temperature, whereby it becomes possible to shorten the vulcanizing time and to make a tire uniform in physical property.

According to the invention in the third aspect, even when the upper annular mold attaching member and the lower annular mold attaching member differ in temperature, the side portion forming molds respectively attached thereto can be heated to a uniform temperature by supplying the heat medium at a high temperature to those being low in temperature. As a result, it becomes possible to make the whole of the molds to a uniform temperature promptly and reliably.

EMBODIMENTS FOR PRACTICING THE INVENTION

Embodiment 1

Figure 1:
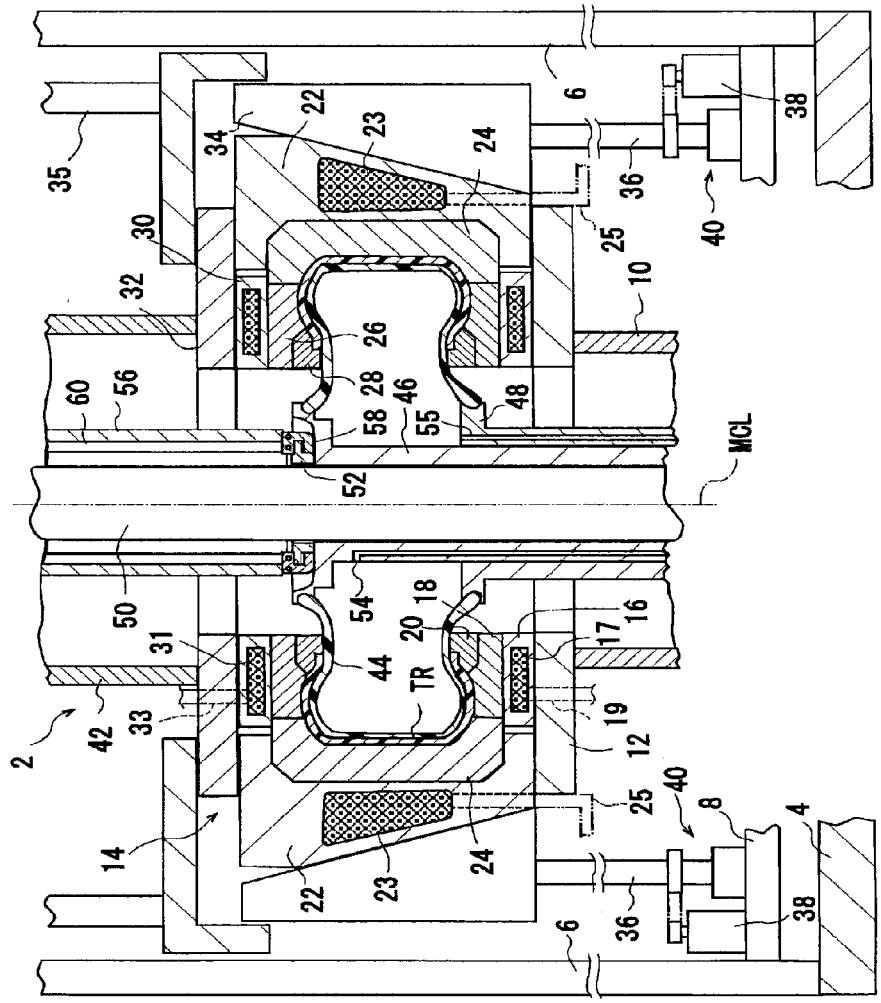
FIG. 1 is a sectional view showing an important portion in construction as viewed from the front side of a tire vulcanizing device in a first embodiment according to the present invention.
Figure 2:
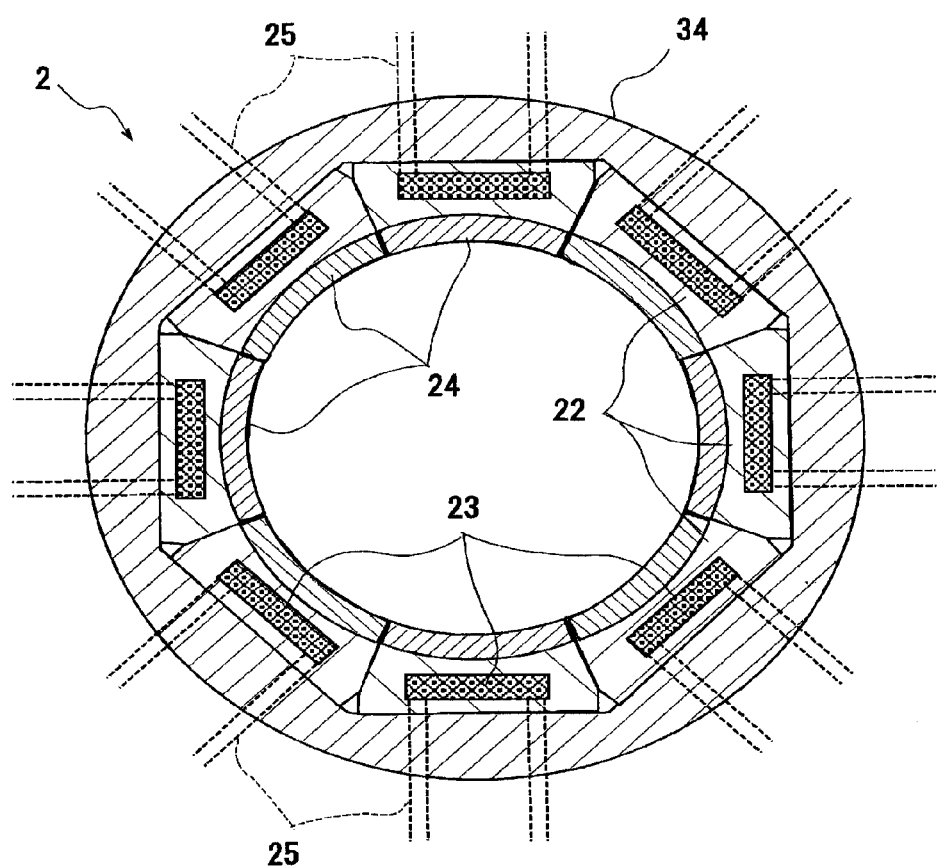
FIG. 2 is a sectional view of the important portion in construction as viewed from above of the tire vulcanizing device.

Hereafter, a tire vulcanizing device in a first embodiment according to the present invention will be described with reference to the drawings. A tire vulcanizing device 2 has a frame taking the form of a vertically long rectangular parallelepiped that is composed of a rectangular base plat 4, four columns 6 upstanding at respective corner portions of the base plat 4, and a top plate (not shown) provided at the upper ends of the columns 6. As shown in FIG. 1, a mold base member 8 is fixed at a position immediately above the base plate 4, and a cylindrical portion 10 vertically extending is provided at a center portion on the mold base member 8. A lower mold supporting table 12 of a hollow disc shape is provided at the upper end of the cylindrical portion 10, and a mold device 14 is mounted on the lower mold supporting table 12. The mold device 14 is mainly composed of a lower annular mold attaching member 16 of a hollow disc shape, a lower sidewall mold 18 and a lower bead mold 20 as side portion forming molds which are secured to the lower annular mold attaching member 16 concentrically with a mold center MCL, segments 22 of, for example, eight pieces which, as shown in FIG. 2, are arranged on the mold supporting table 12 at equiangular intervals about the mold center MCL and which are supported to be able to advance and retract in radial directions, segmented tread molds 24 attached to the respective segments 22, an upper sidewall mold 26 and an upper bead mold 28 as side portion forming molds which are combined with upper end portions of the segmented tread molds 24, an upper annular mold attaching member 30 to which the sidewall mold 26 and the upper bead mold 28 are secured concentrically with the mold center MCL, and an upper mold supporting table 32 with the upper annular mold attaching member 30 secured to a lower surface thereof.

Each segmented tread mold 24 takes a circular arc shape having a circular arc length of a predetermined angle (for example, 45 degrees in the case of eight segments) and is provided with a tread forming surface on which a predetermined tread pattern is formed at the center portion in the height direction of an inner surface thereof.

Each segment 22 attaching the segmented tread mold 24 thereto is engaged at its lower surface with the lower mold supporting table 12 through a dovetail groove. The respective segments 22 are supported to be restrained by the dovetail-groove engagements from the relative movement in the vertical direction and are movable to be guided in radial directions. Respective outer circumferential surfaces of the respective segments 22 are formed to taper surfaces, and the center portions in the circumferential direction on the taper surfaces are engaged with the internal surface of a mold closing ring member 34 through dovetail grooves. The mold closing ring member 34 is fitted into and secured to an annular ring holder (not shown) which is vertically movably guided along linear guides (not shown) fixed on the columns 6, and is moved up and down by screw shafts 36 rotatably supported on the mold base member 8. The screw shafts 36 are rotationally driven by servomotors 38 through pulley-belt mechanisms 40 to move the mold closing ring member 34 up and down, whereby the segmented tread molds 24 can be opened and closed by being moved in the radial directions. The respective segments 22 are respectively independently provided with heat medium passages 23 as heat application means for supplying a heat medium (for example, steam or high-temperature inert gas), and heat medium supplying devices (not shown) which can be independently controlled in temperature are in communication with the respective heat medium passages 23 through supply pipes 25.

The aforementioned sidewall molds 18, 26 and bead molds 20, 28 on the upper and lower sides are dividably combined with the opposite end portions in the vertical direction of the segmented tread molds 24 to respectively form sidewall surfaces and bead surfaces of a tire TR. The sidewall mold 18 and the bead mold 20 on the lower side are fixed on the lower annular mold attaching member 16, and the lower annular mold attaching member 16 is fixed on the lower mold supporting table 12. A lower heat medium passage 17 as lower heat application means for supplying a heat medium is annularly provided in the lower annular mold attaching member 16, and the lower heat medium passage 17 is in communication with a heat medium supplying device (not shown) through a supply pipe 19.

The sidewall mold 26 and the bead mold 28 on the upper side are fixed on the upper mold supporting table 32 through the upper annular mold attaching member 30. An upper heat medium passage 31 as upper heat application means for supplying the heat medium is annularly provided in the upper annular mold attaching member 30, and the upper heat medium passage 31 is in communication with a heat medium supplying device (not shown) which differs from that for the lower heat medium passage 17, through a supply pipe 33. The upper mold supporting table 32 is assembled to a movable frame 35 which is moved up and down along guide rails (not shown) provided on the columns 6. The movable frame 35 is provided with an upper plate (not shown) and a connection sleeve 42 which extends downward from the upper plate and which is arranged coaxially with the mold center MCL. Lower end portions of screw shafts (not shown) extending in the vertical direction are fixed to the upper plate, while upper end portions of the screw shafts extend to pass through the top plate. The upper end portions of the screw shafts are screw-engaged with nuts which are rotationally supported on the upper surface of the top plate respectively through thrust bearings (not shown), and the nuts are in driving connection with a servomotor mounted on the top plate through a pulley-belt mechanism. By the operation of the servomotor, it is possible to vertically position the movable frame 35 together with the sidewall mold 26 on the upper side and the bead mold 28 on the upper side, so that the sidewall mold 26 on the upper side can be combined with the upper end portions of the segmented tread molds 24.

A bladder 44 inserted inside a tire TR is provided at the center of the cylindrical portion 10 and is manipulated mainly by a first bladder operating sleeve 46 being hollow which is arranged coaxially with the mold center MCL and a second bladder operating sleeve 48 which is fitted on the outer circumference of the sleeve 46. The first bladder operating sleeve 46 extends with its center portion closely fitted on a centering shaft 50 and has an upper end portion of the bladder 44 air-tightly fitted at the upper end portion thereof. A gripped ring 52 is fixed on the center of the upper end portion of the first bladder operating sleeve 46. An air supply passage 54 for vapor is formed in the first bladder operating sleeve 46, and the upper end of the air supply passage 54 opens inside the bladder 44, whereas the lower end is connected to a vapor supply device (not shown). The first bladder operating sleeve 46 is moved together with a connection sleeve (referred to later) 56 up and down with the gripped ring 52 grasped by connection claws 58 (referred to later).

The connection sleeve 56 for operating the first bladder operating sleeve 46 is arranged coaxially with the connection sleeve 42 and is fitted at its center through hole on the outer circumference of the centering shaft 50 to be relatively slidable in the axial direction. The lower end of the connection sleeve 56 supports a pair of the connection claws 58 at two diametrically-opposed positions to be able to open and close the connection claws 58, and these connection claws 58 are pivotally connected to operating rods 60 respectively through links. The upper end portions of the operating rods 60 are coupled to pistons of a pair of air cylinders (not shown) provided at the upper end portion of the connection sleeve 56, so that the connection claws 58 are able to be opened and closed by the operations of the air cylinders. A nut (not shown) is fixed to the upper end of the connection sleeve 56, and the nut is screw-engaged with a screw shaft (not shown) which is rotatable by a servomotor (not shown) fixed on the upper plate (not shown) through a pulley-belt mechanism (not shown). The screw shaft is supported by the upper plate to be rotatable only. When the servomotor fixed on the upper plate is operated, the connection sleeve 56 can be lowered relative to the movable frame 35, and the connection claws 58 grasp the gripped ring 52 when closed at the lowered position.

The lower end portion of the bladder 44 is air-tightly fitted on the upper end portion of the second bladder operating sleeve 48. A nut (not shown) is fixed on the lower end portion of the second bladder operating sleeve 48, and the nut is screw-engaged with a screw shaft (not shown) which is rotatably supported on the mold base member 8 to extend vertically. The screw shaft is rotated through a pulley-belt mechanism by a servomotor (not shown) attached to the mold base member 8, so that the second bladder operating sleeve 48, that is, the lower end portion of the bladder 44 can be adjusted in the vertical direction. Thus, in corporation with the position adjusting operation of the upper end portion of the bladder 44, the screw shaft can move the bladder 44 between a vulcanizing position where the bladder 44 is brought into alignment with the segmented tread molds 24, and a tire delivery position. The second bladder operating sleeve 48 is formed with an exhaust passage 55 opening to its upper end, so that the steam or the like supplied into the bladder 44 for vulcanization is exhausted after each vulcanization.

By operating the servomotor fixed to the mold base member 8 to go up the second bladder operating sleeve 48 and by synchronously operating the servomotor (upper plate) to go up the first bladder operating sleeve 46 bodily joined to the connection sleeve 56, the bladder 44 can be moved from the vulcanizing position to the delivery position on the upper side of the vulcanizing position with itself kept in an expanded state. Therefore, the bladder 44 also operates as a tire molding and unmolding device that transfers and molds a green tire to be vulcanized next from the delivery position to the vulcanizing position and that unmolds and transfers the vulcanized tire TR from the vulcanizing position to the delivery position.

Figure 3:
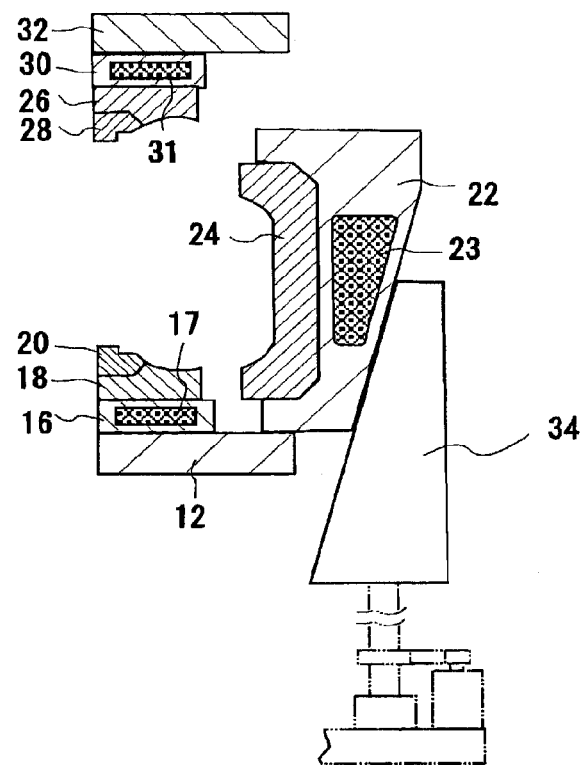
FIG. 3 is a sectional view as viewed from a lateral side, showing the state of a mold device being opened.

Description will be made regarding forming and vulcanizing a green tire by the tire vulcanizing device 2 constructed as described above. Before the green tire TR is loaded, as shown in FIG. 3, the lower annular mold attaching member 16 with the sidewall mold 18 and the bead mold 20 on the lower side attached thereto is in the state of being fixed on the lower mold supporting table 12, the upper annular mold attaching member 30 with the sidewall mold 26 and the bead mold 28 on the upper side secured thereto is in the state of being attached to the upper mold supporting table 32, and the upper mold supporting table 32 is in the state of being on standby at an upper position by being lifted up by the movable frame 35 (refer to FIG. 1). The centering shaft 50 is in the state of having been drawn out upward from the first bladder operating sleeve 46, and the connection sleeve 56 is in the state of being on standby at an upper position with the engagement between the gripped ring 52 and the connection claws 58 released (refer to FIG. 1). Further, the respective segments 22 with the segmented tread molds 24 attached thereto are in the state of being on standby at an open position where they are opened by moving the mold closing ring member 34 downward (refer to FIG. 3). In the annular mold attaching members 16, 30 on the upper and lower sides, steam as a heat medium has been supplied to the respective heat medium passages 17, 31. Since the upper annular mold attaching member 30 tends to become low in temperature, the heat medium passage 31 is supplied with the steam which has been controlled to be higher in temperature than that to the lower heat medium passage 17. Likewise, the steam is supplied also to the heat medium passages 23 of the respective segments 22 to heat the segmented tread molds 24.

Thereafter, the green tire TR is loaded by a loading/unloading device (not shown) to the tire delivery position that is between the first bladder operating sleeve 46 and the centering shaft 50 being on standby on the upper side (hereinafter, infer in FIG. 1). Then, the centering shaft 50 and the connection sleeve 56 are moved down to pass through a hollow hole of the green tire TR, the centering shaft 50 is inserted into the first bladder operating sleeve 46, and the connection claws 58 of the connection sleeve 56 are engaged with the gripped ring 52 of the first bladder operating sleeve 46.

Then, the connection sleeve 56 is moved upward together with the first bladder operating sleeve 46, and the bladder 44 in the state of being extended is inserted into the hollow hole of the green tire TR, and the bladder 44 is positioned with itself having been inserted into the hollow hole. At this time, the second bladder operating sleeve 48 is moved upward with a time difference and is stopped to a predetermined position.

Subsequently, the second bladder operating sleeve 48 on the lower side and the first bladder operating sleeve 46 on the upper side are synchronized to come close to each other toward the center position in the width direction of the green tire TR, whereby sidewalls of the bladder 44 being loosen are inserted inside the green tire TR. Then, compressed air is fed into the bladder 44 to gradually expand the bladder 44 radially outward at the center position in the width direction of the green tire TR. In this way, the green tire TR is held by the bladder 44 from the inside thereof, and the movable frame (including the connection sleeve 56) 35 and the first bladder operating sleeve 46 on the upper side and the second bladder operating sleeve 48 on the lower side are moved down synchronously, whereby the green tire TR held by the bladder 44 is moved down to the vulcanizing position where the center thereof in the width direction comes to align with the center in the width direction (vertical direction) of the segmented tread molds 24. At this time, since the segmented tread molds 24 are at the opening position where they have been opened in the radial directions, the green tire TR is led and molded to the vulcanizing position without interfering with the segmented tread molds 24. Then, the upper mold supporting table 32 is positioned to the position where the attached sidewall mold 26 on the upper side can be combined with the segmented tread molds 24.

Figure 4:
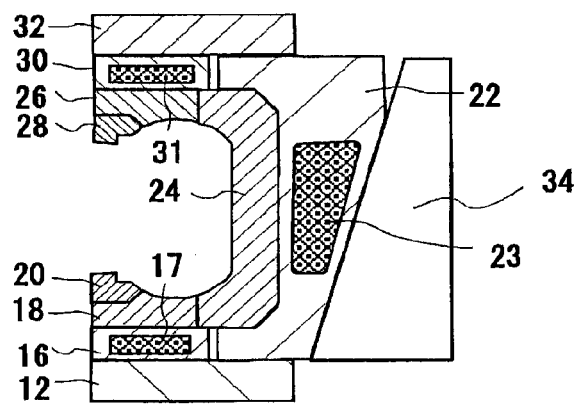
FIG. 4 is a sectional view as viewed from the lateral side, showing the state of the mold device being closed.

Subsequently, the screw shafts 36 are rotated by the operations of the servomotors 38 to move the mold closing ring member 34 upward along the columns 6, whereby the segments 22 with the segmented tread molds 24 assembled thereto are moved radially inward as they are slidden at upper and lower surfaces thereof on the lower surface of the upper mold supporting table 32 as well as on the upper surface of the lower mold supporting table 12, and is positioned to a closed position (refer to FIG. 4). At the advanced end so moved, the respective segmented tread molds 24 are stopped with arc surfaces thereof on the upper and lower sides held in close contact with the outer circumferential surfaces of the sidewall molds 26, 18 on the upper and lower sides. Thereafter, the ring holder (not shown) fixed to the mold closing ring member 34 and the movable frame 35 are joined, whereby the respective segmented tread molds 24 which have been moved to the advanced end are locked.

In this state, heated vapor (for example, steam or heated inert gas) is supplied from the air supply passage 54 formed in the first bladder operating sleeve 46 to the inside of the bladder 44, at the same time of which the compressed air supplied before is discharged from the exhaust passage 55 to perform gas exchange in the bladder 44. It is preferable that the gas exchange is carried out as the pressure change in the bladder 44 is detected not to lower the inside pressure. As a result, the green tire TR is pressurized and heated through the bladder 44 and is vulcanized in corporation of the bladder 44 with the heated molds 18, 20, 24, 26, 28 on the outer side.

After the vulcanizing process is performed for a predetermined period of time, the locking of the respective segmented tread molds 24 is released, and the mold closing ring member 34 is moved down by the reverse operations of the servomotors 38. By the downward movement of the mold closing ring member 34, the segments 22 and the segmented tread molds 24 are positioned to the open position being radially outward to ready for an unmolding operation for the vulcanized tire TR.

Thereafter, the movable frame 35, the centering shaft 50, the connection sleeve 56 and the first bladder operating sleeve 46 having still been joined to the connection sleeve 56 are moved upward, and the second bladder operating sleeve 48 is also moved upward. At this time, the upward moving speed of the movable frame 35 is set to be faster than the upward moving speed of the second bladder operating sleeve 48 and the connection sleeve 56, so that the second bladder operating sleeve 48 and the connection sleeve 56 are operated to be relatively moved downward relative to the movable frame 35. Thus, the bladder 44 can unmold and move upward the vulcanized tire TR held thereby so that the vulcanized tire TR is separated from the sidewall mold 18 on the lower side and is separated from the sidewall mold 26 on the upper side at the same speed. The vulcanized tire TR is unloaded to the tire delivery position with itself held by the bladder 44 from the inside thereof, and the loading/unloading device is advanced from the outside of the vulcanizing device 2 and holds the outer circumference of the vulcanized tire TR.

When the vulcanized tire TR is confirmed to have been held by the loading/unloading device, the heated gas in the bladder 44 is discharged outside from the exhaust passage 55 to contract the bladder 44, whereby the holding of the vulcanized tire TR by the bladder 44 is released. Then, the connection sleeve 56, the first bladder operating sleeve 46 and the second bladder operating sleeve 48 are moved downward, and at the lowered position, the first bladder operating sleeve 46 is cut off from the joining to the connection sleeve 56. Thereafter, the connection sleeve 56 is moved upward to the elevated end, the centering shaft 50 is also moved upward to the elevated end, and the vulcanized tire TR is unloaded outside the machine by the loading/unloading device.

According to the tire vulcanizing device 2 as constructed above, the heat medium passage (heat application means) 23 is provided in each of the segments 22 respectively attaching the segmented tread molds 24 thereto. Thus, each tread mold 24 can be efficiently heated from the position adjacent thereto. In particular, where a plurality of tires TR are vulcanized in succession, the molds 24 are opened to replace the tires TR after each vulcanization, and this results in lowering the temperature of the tread molds 24 once. However, by shortening the time taken to raise the tread molds 24 in temperature, it becomes possible to shorten the vulcanizing time and hence, to enhance the efficiency in manufacturing the tires TR.

Further, since the heat medium passages 23 are respectively independent of one another for the respective segments 22, it does not take place that as is the case of the prior art, the temperature difference is brought about between the molds which are heated around the inlet and outlet of the heat medium passages, due to the temperature drop of the heat medium taking a round of the tread molds. Thus, the molds 18, 20, 24, 26 and 28 can be heated uniformly during the vulcanization, so that a tire TR being uniform in physical property can be obtained. The shortening of the vulcanizing time can be realized because it is not required to set the vulcanizing time to meet those being low in temperature.

Further, it is possible to heat the tread molds 24 by individually adjusting the temperatures of the respective segments 22. Thus, by adjusting the temperatures of the heated molds 18, 20, 24, 26 and 28 to be uniform, the molds can be made to be uniform as a whole in temperature, whereby it becomes possible to shorten the vulcanizing time and to make the obtained tire TR uniform in physical property.

Further, even when the upper annular mold attaching member 30 and the lower annular mold attaching member 16 differ in temperature, it is possible to heat the side portion forming molds 18, 20, 26 and 28 attached thereto to a uniform temperature by supplying the high-temperature heat medium to those molds which are low in temperature, whereby the whole of the molds can be heated to a uniformity temperature promptly and reliably.

Embodiment 2

Figure 5:
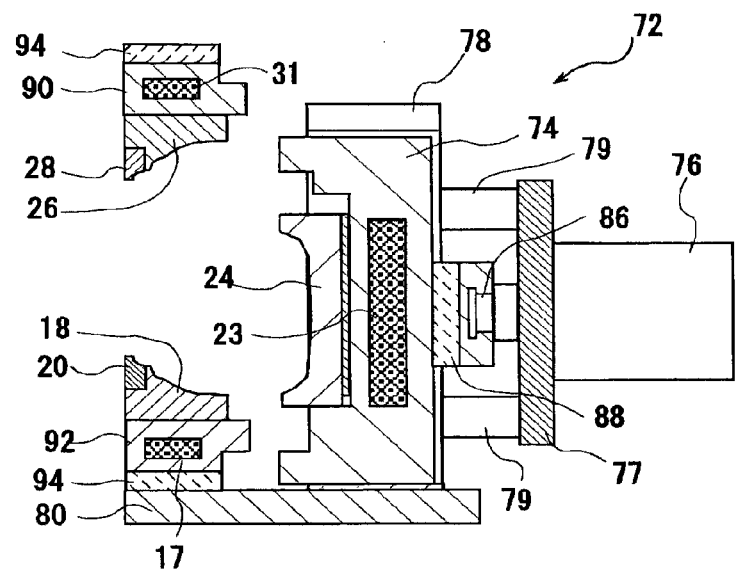
FIG. 5 is a sectional view as viewed from the lateral side, showing the state of a mold device being opened in a tire vulcanizing device in a second embodiment.
Figure 6:
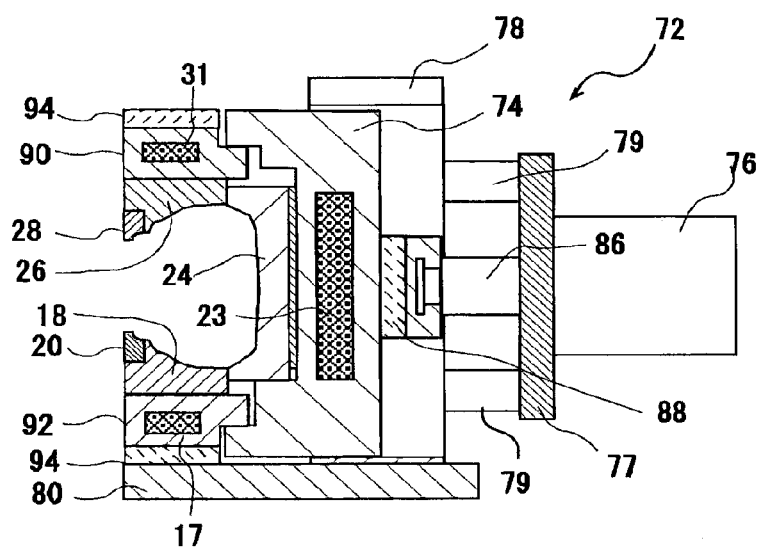
FIG. 6 is a sectional view as viewed from the lateral side, showing the state of the mold device being closed.

Next, a tire vulcanizing device in a second embodiment according to the present invention will be described with reference to the drawings. As shown in FIGS. 5 and 6, the tire vulcanizing device 72 in the present embodiment mainly differs in that moving devices for moving the segmented tread molds 24 and segments 74 in the radial directions comprise cylinders 76 and that each of the segments 74 and the like provided with the heat medium passages 23 is provided with a heat insulation member 88 and the like. The segmented tread molds 24 are divided into eight pieces in the circumferential direction, and the segmented tread molds 24 so divided are assembled to the segments 74 respectively corresponding thereto. Each segment 74 is formed to an almost rectangular shape as viewed from above, and guide members 78 each taking an almost wedge shape (as viewed from above) are respectively provided between the adjoining segments 74. The respective guide members 78 are secured to a lower mold supporting table 80. The guide members 78 guide the segments 74 movably in the radial directions and are provided with stoppers (not shown) which restrict the advanced ends of the segments 74 upon engagements with respective pairs of engaging portions (not shown) provided on the outward back surfaces of the segments 74. The respective segments 74 attaching the segmented tread molds 24 thereto are engaged at lower surfaces thereof with the lower mold supporting table 80 through dovetail grooves. By the dovetail-groove engagements, the respective segments 74 are supported to be restricted in the relative movement in the vertical direction and are movably guided in the radial directions. The respective cylinders 76 are provided on the outward back sides of the respective segments 74. Each cylinder 76 is provided to stand on two adjoining guide members 78. A cylinder support plate 77 is arranged on the back side of two adjoining guide members 78, and props 79 through which bolts (not shown) pass are protruded from the cylinder support plate 77 at two places in the vertical direction of either side portion, to face the guide members 78. The cylinders 76 are provided at the center portions of the cylinder support plates 77, and the ends of piston portions 86 of the cylinders 76 are assembles to the back surfaces of the segments 74 through the respective heat insulation members 88. By the driving of the cylinders 76, the segments 74 are moved between a closing position where the segmented tread molds 24 at an advanced end are closed, and an opening position where the segmented tread molds 24 are opened. The cylinders 76 are configured to be controllable independently of one another. The heat insulation members 88 provided between the segments 74 and the ends of the piston portions 86 of the cylinders 76 prevent the heat of the segments 74 from being conveyed to the cylinders 76, whereby it can be prevented that the temperature increase of the molds 24 is caused to delay due to the heat conduction to the cylinders 76. Heat insulation members 94 are provided respectively between an upper annular mold attaching member 90 and an upper mold supporting table (not shown) and between a lower annular mold attaching member 92 and the lower mold supporting table 80, so that the heats of the heated annular mold attaching members 90, 92 are prevented from being conducted to the mold supporting tables 80 on the upper and lower sides. Consequently, the molds including the segmented tread molds 24, the sidewall molds 26 and the like are heated effectively, whereby the vulcanizing time can be shortened. Other constitutions are the same as those in the first embodiment, and description therefor will be omitted.

Figure 7:
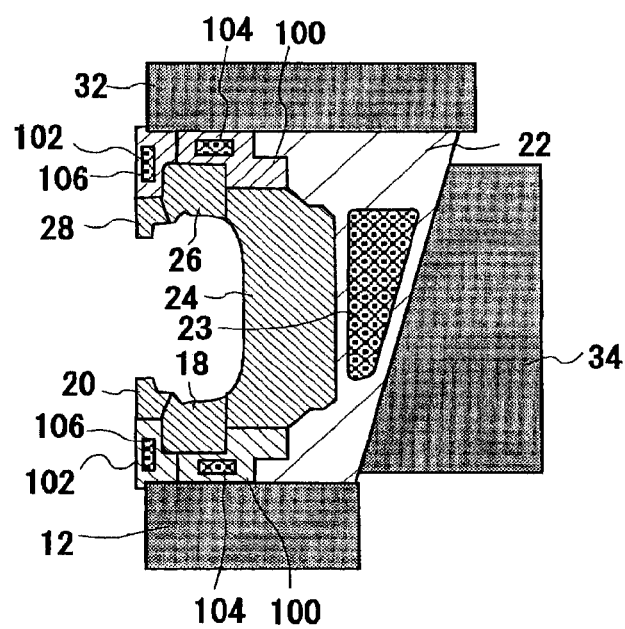
FIG. 7 is a sectional view showing another embodiment provided with heat medium passages which heat bead molds.

In the foregoing embodiments, one channel of the heat medium passage for heating the side portion forming molds is provided on each of the upper and lower sides. However, as shown in FIG. 7, each of the annular mold attaching members on the upper and lower sides may be divided into a sidewall mold attaching member 100 and a bead mold attaching member 102, and these members may be respectively provided with a sidewall mold heat medium passage 104 and a bead mold heat medium passage 106 as the respective heat medium passages. Thus, it becomes possible to heat the bead portions, being thick portions of a tire that are required to be vulcanized at a high temperature, at a high temperature if need be. Thus, it becomes possible to manufacture a tire of a high quality as a result of performing the vulcanizing process efficiently.

As described above, the specific constructions described in the aforementioned embodiments are no more than the exemplifications of the present invention. The present invention is not limited to such specific constructions and may take various forms without departing from the gist of the present invention.

Industrial Applicability

The tire vulcanization of the present invention is suitable for use in manufacturing tires through vulcanizations in succession.

The invention claimed is:

1. A tire vulcanizing device comprising:
an upper annular mold attaching member and a lower annular mold attaching member that respectively attach side portion forming molds for forming side portions of a tire;
a plurality of segments that respectively attach a plurality of segmented tread molds for forming a tread portion of the tire;
a plurality of cylinders for respectively moving the plurality of segments in radial directions to close the respective tread molds at an advanced end, each cylinder being connected to a cylinder support plate from which a prop protrudes to connect to a guide member that guides the respective segment;
heat medium passages respectively independently provided in the respective segments for applying heat for vulcanization to the tread molds when supplied with a heat medium; and
heat insulation members respectively interposed between the segments and the cylinders for preventing conduction of heat from the segments to the cylinders;
wherein the heat medium passages are controllable in temperature on a segment-by-segment basis.

2. The tire vulcanizing device in claim 1, further comprising:
an upper mold supporting table and a lower mold supporting table that respectively support the upper annular mold attaching member and the lower annular mold attaching member;
an upper heat medium passage provided in the upper annular mold attaching member for applying heat for vulcanization to one of the side portion forming molds when supplied with a heat medium;
a lower heat medium passage provided in the lower annular mold attaching member for applying heat for vulcanization to the other of the side portion forming molds when supplied with the heat medium; and
heat insulation members respectively provided between the upper annular mold attaching member and the upper mold supporting table and between the lower annular mold attaching member and the lower mold supporting table;
wherein the upper heat medium passage and the lower heat medium passage are respectively supplied with the heat mediums being different in temperature.

3. The tire vulcanizing device in claim 1, wherein the upper annular mold attaching member and the lower annular mold attaching member comprise:
sidewall mold attaching members respectively attaching sidewall molds for forming sidewall portions of the tire;
bead mold attaching members respectively attaching bead molds for forming bead portions of the tire; and each of the sidewall mold attaching members and the bead mold attaching members is provided with a heat medium passage therein.

* * * * *